US010225383B2

(12) United States Patent
Lee et al.

(10) Patent No.: US 10,225,383 B2
(45) Date of Patent: Mar. 5, 2019

(54) MOBILE TERMINAL

(71) Applicant: LG ELECTRONICS INC., Seoul (KR)

(72) Inventors: Haklim Lee, Seoul (KR); Hanseok Chae, Seoul (KR); Wonseok Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/577,182

(22) PCT Filed: Aug. 5, 2015

(86) PCT No.: PCT/KR2015/008179
§ 371 (c)(1),
(2) Date: Nov. 27, 2017

(87) PCT Pub. No.: WO2016/190486
PCT Pub. Date: Dec. 1, 2016

(65) Prior Publication Data

US 2018/0183911 A1 Jun. 28, 2018

(30) Foreign Application Priority Data

May 27, 2015 (KR) ........................ 10-2015-0074133

(51) Int. Cl.
*H04B 1/38* (2015.01)
*H04M 1/02* (2006.01)

(52) U.S. Cl.
CPC ........... *H04M 1/0214* (2013.01); *H04M 1/02* (2013.01); *H04M 1/0264* (2013.01); *H04M 1/0268* (2013.01)

(58) Field of Classification Search
CPC ............. H04M 1/0214; H04M 1/0264; H04M 1/0268; G06F 1/1616; G06F 1/1681
See application file for complete search history.

(56) References Cited

U.S. PATENT DOCUMENTS

2010/0232100 A1* 9/2010 Fukuma .................. F16G 13/18 361/679.01
2015/0018045 A1* 1/2015 Cha ..................... H04M 1/0266 455/566

FOREIGN PATENT DOCUMENTS

JP 2014-26385 A 2/2014
KR 10-2014-0024145 A 2/2014
KR 10-2014-0091273 A 7/2014
(Continued)

*Primary Examiner* — Tuan Pham
(74) *Attorney, Agent, or Firm* — Birch, Stewart, Kolasch & Birch, LLP

(57) ABSTRACT

A mobile terminal having a body including a first body and a second body, a display positioned on one surfaces of the first and second bodies and commonly overlapping the first and second bodies, and a hinge assembly positioned between the first and second bodies and connecting the first and second bodies is provided. At least a partial structure of the hinge assembly slidingly moves with respect to another structure of the hinge assembly so that a position of the first and second bodies is changed from a first state in which the first and second bodies are disposed on the same plane to a second state in which one of the first and second bodies is folded on the other. The mobile terminal can smoothly change a state of the body of the mobile terminal using the hinge assembly that slidingly moves and has a variable length.

17 Claims, 21 Drawing Sheets

(56) References Cited

FOREIGN PATENT DOCUMENTS

| | | | |
|---|---|---|---|
| KR | 10-2015-0031602 | A | 3/2015 |
| KR | 10-2015-0037383 | A | 4/2015 |

* cited by examiner (a)

(b)

MOBILE TERMINAL

CROSS REFERENCE TO RELATED APPLICATIONS

This application is the National Phase of PCT International Application No. PCT/KR2015/008179, filed on Aug. 5, 2015, which claims priority under 35 U.S.C. 119(a) to Patent Application No. 10-2015-0074133, filed in the Republic of Korea on May 27, 2015, all of which are hereby expressly incorporated by reference into the present application.

TECHNICAL FIELD

The present disclosure relates to a mobile terminal for smoothly changing a state of a body of the mobile terminal using a hinge assembly that slidingly moves and has a variable length.

BACKGROUND ART

Terminals may be generally classified into mobile/portable terminals and stationary terminals based on a mobility. The mobile terminals may also be classified into handheld terminals and vehicle mounted terminals depending on whether or not a user can directly carry the terminal.

Mobile terminals have increasingly more functions. Examples of the functions include data and voice communications, taking pictures and videos with a camera, recording audio, playing music files using a speaker system, and displaying images and video on a display. Some mobile terminals include additional functionality which supports game playing, while other terminals are configured as multimedia players. More recently, the mobile terminals have been configured to receive broadcast and multicast signals which permit viewing of content such as videos and television programs.

As the mobile terminals have increasingly more functions, the mobile terminals have been implemented as multimedia players of multiple functions having taking pictures and videos, playing music files or video, game playing, receiving broadcast, and the like.

Efforts are ongoing to support and increase the functionality of mobile terminals. Such efforts include software and hardware improvements, as well as changes and improvements in the structural components.

DISCLOSURE

Technical Problem

An object of the present disclosure is to address the above-described and other problems. Another object of the present disclosure is to provide a mobile terminal capable of smoothly changing a state of a body of the mobile terminal using a hinge assembly that slidingly moves and has a variable length.

Technical Solution

In one aspect of the present disclosure, there is provided a mobile terminal including a body including a first body and a second body, a display positioned on one surfaces of the first and second bodies and commonly overlapping the first and second bodies, and a hinge assembly positioned between the first and second bodies, connecting the first and second bodies, and having a varying length, wherein at least a partial structure of the hinge assembly slidingly moves with respect to another structure of the hinge assembly so that a position of the first and second bodies is changed from a first state in which the first and second bodies are disposed on the same plane to a second state in which one of the first and second bodies is folded on the other.

The hinge assembly may connect a first side of the first body to a second side of the second body. A sliding length of the hinge assembly may correspond to a change in a distance between the first side and the second side resulting from a change from the first state to a specific state of the first and second bodies.

In the second state, a third side opposite the first side of the first body may contact a fourth side opposite the second side of the second body. The first side of the first body may be spaced apart from the second side of the second body by the hinge assembly.

A sliding length of the hinge assembly may correspond to a distance between the first side and the second side which are spaced apart from each other by the hinge assembly.

The hinge assembly may include a main hinge guiding a folding angle between the first and second bodies, and a parallel hinge causing the first and second bodies to maintain a specific state including the first and second states.

The main hinge may include a plurality of main blocks that is positioned on the same plane in the first state and is positioned on different planes in the second state.

The plurality of main blocks may include a first main block, and a second main block fastened to a coupling portion of the first main block, the second main block having a second support surface contacting a first support surface of the first main block in the first state and a fourth support surface contacting a third support surface of the first main block in the second state.

A displacement angle of the main hinge may be a sum of displacement angles determined by a contact between the second and fourth support surfaces and the first and third support surfaces of each of the plurality of main blocks.

The parallel hinge may include a plurality of hinge blocks that is positioned on the same plane in the first state and is positioned on different planes in the second state.

The plurality of hinge blocks may include a first hinge block, and a second hinge block including a tip that is coupled to a first recess of the first hinge block in the first state and is coupled to a second recess of the first hinge block in the second state, and an elastic body pressing the tip in a direction of the first hinge block.

At least one of the main hinge and the parallel hinge may include a guide hole coupled to the first and second bodies, and a guide pin inserted into the guide hole and moving along the guide hole correspondingly to a change in the position of the first and second bodies.

The mobile terminal may further include a controller configured to selectively activate the display depending on a state of the body.

The mobile terminal may further include at least one camera positioned outside the body and a controller configured to inactivate the display and activate the camera in the second state.

The mobile terminal may further include a controller configured to change a display direction of an image displayed on the display depending on an orientation direction of the body.

The display may be a flexible display that is bent corresponding to a change in the state of the first and second bodies.

Advantageous Effects

An effect of a mobile terminal according to the present disclosure is described as follows.

According to at least one aspect of the present disclosure, the present disclosure has an advantage in smoothly changing a state of a body of a mobile terminal using a hinge assembly that slidingly moves and has a variable length.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

MODE FOR INVENTION

Figure 1:
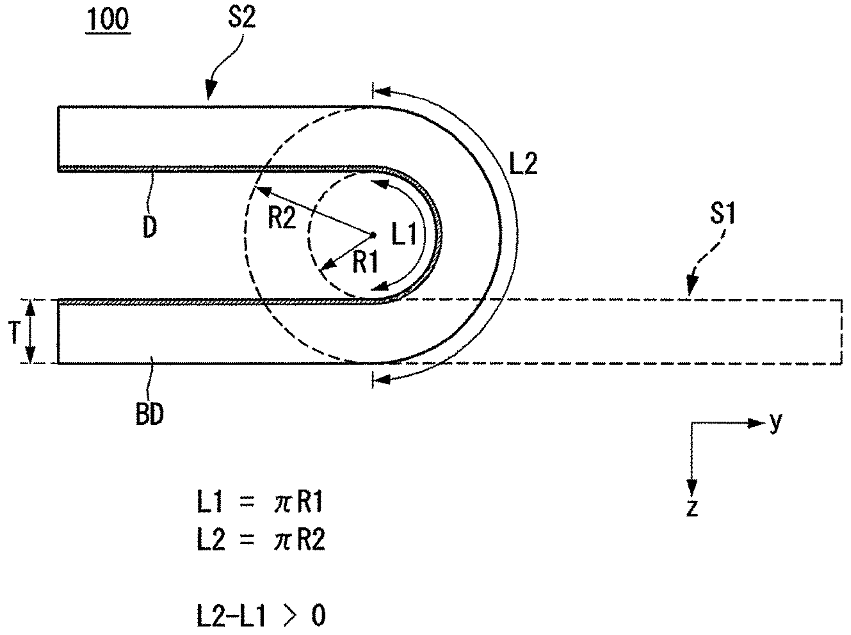
FIGS. 1 and 2 illustrate an operation of a mobile terminal.

Reference will now be made in detail to embodiments of the invention, examples of which are illustrated in the accompanying drawings. Wherever possible, the same reference numbers will be used throughout the drawings to refer to the same or like parts. In general, a suffix such as “module” and “unit” may be used to refer to elements or components. Use of such a suffix herein is merely intended to facilitate description of the specification, and the suffix itself is not intended to give any special meaning or function. It will be noted that a detailed description of known arts will be omitted if it is determined that the detailed description of the known arts can obscure the embodiments of the invention. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

The terms ‘first’, ‘second’, etc. may be used to describe various components, but the components are not limited by such terms. The terms are used only for the purpose of distinguishing one component from other components.

When an arbitrary component is described as “being connected to” or “being coupled to” another component, this should be understood to mean that still another component(s) may exist between them, although the arbitrary component may be directly connected to or directly coupled to another component. In contrast, when an arbitrary component is described as “being directly connected to” or “being directly coupled to” another component, this should be understood to mean that no component exists between them.

A singular expression can include a plural expression as long as it does not have an apparently different meaning in context.

In the present application, the terms “include” and “have” should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Mobile terminals disclosed herein may be implemented using a variety of different types of devices. Examples of such devices include cellular phones, smart phones, laptop computers, digital broadcast terminals, personal digital assistants (PDAs), portable multimedia players (PMPs), navigators, slate computers (PCs), tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of mobile terminals, such as those types noted above. In addition, these teachings may also be applied to stationary terminals such as digital TV, desktop computers, digital signage, and the like.

Figure 2:
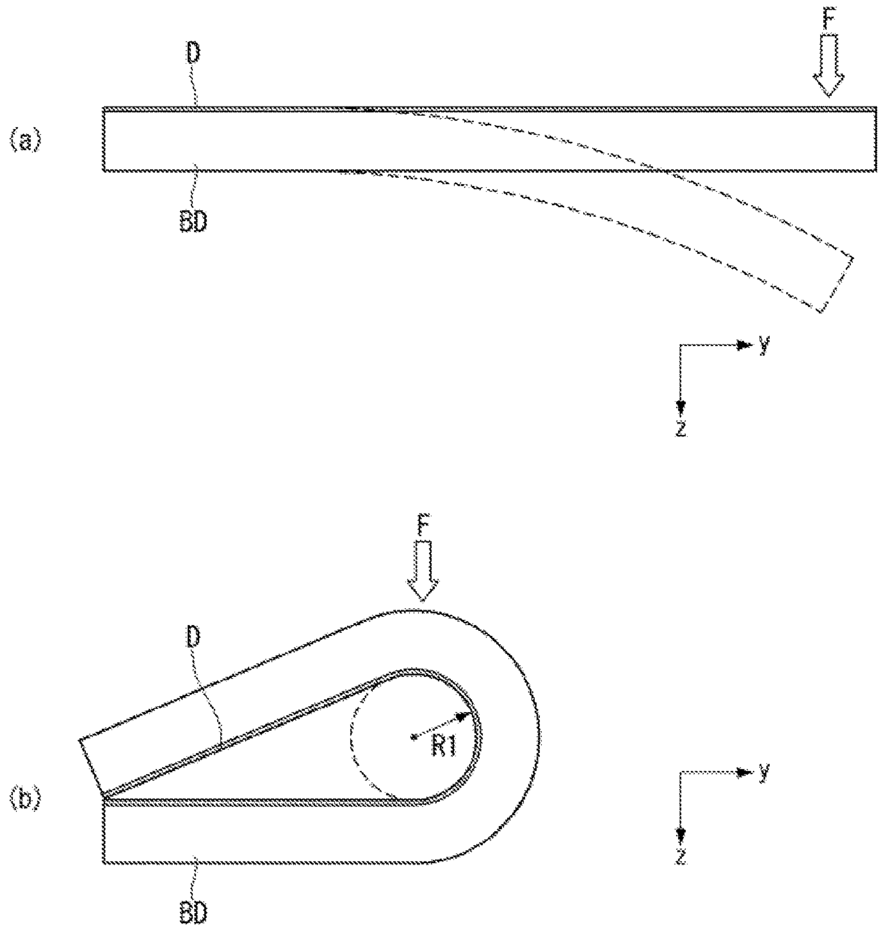

FIGS. 1 and 2 illustrate an operation of a mobile terminal.

As shown in FIGS. 1 and 2, a mobile terminal 100 according to an embodiment of the disclosure may be a foldable mobile terminal in which a body BD is foldable. For example, the mobile terminal may be configured such that one end and the other end of the body BD come close to and/or in contact with each other. A display D may be provided on at least one side of the body BD.

As shown in FIG. 1, the display D may be substantially entirely formed on at least one surface of the body BD. This may be different from a related art folder phone. Namely, unlike the related art folder phone in which a display area is present in a portion of one surface of a body, the mobile terminal 100 according to the embodiment of the disclosure may be configured such that the single display D is positioned from one end to the other end of the body BD.

The display D may be a flexible display. Namely, when the body BD is folded, the display D may be folded according to the folded body BD. This may be different from a related art display. The flexible display D may be substantially entirely formed on at least one surface of the body BD.

The mobile terminal 100 may have a predetermined thickness. Namely, the mobile terminal 100 may have the predetermined thickness of T in a Z-axis direction. The thickness of the mobile terminal 100 may be a sum of thicknesses of components of the mobile terminal 100 including the body BD, the display D, etc. in the Z-axis direction.

The mobile terminal 100 may be in a first state S1 or a second state S2.

The first state S1 may be a state in which the body BD is unfolded. For example, when the body BD is divided into a plurality of areas, the first state S1 may be a state in which the plurality of areas of the body BD is disposed on the same plane. In the first state S1, the mobile terminal 100 may be seen as a stick shape.

The second state S2 may be a state in which the body BD is bent. For example, the second state S2 may be a state in which one area of the plurality of areas of the body BD is folded to another area. In the second state S2, a length of the mobile terminal 100 may be seen to be about one half.

In a process for changing the mobile terminal 100 from the first state S1 to the second state S2, there may be a length difference between an inner surface and an outer surface of the body BD. The length difference may occur by the thickness T of the mobile terminal 100. Namely, there may be a difference between a first radius R1 corresponding to the inner surface of the body BD and a second radius R2 corresponding to the outer surface of the body BD due to the thickness T of the mobile terminal 100. In the second state S2 in which the body BD is folded, a length of the outer surface of the body BD may be longer than a length of the inner surface of the body BD due to a difference between the first and second radiuses R1 and R2. When the length of the outer surface of the body BD is longer than the length of the inner surface of the body BD, wrinkles may occur in the display D on the inner surface of the body BD when the body BD is folded.

In the second state S2, the first radius R1 of the inner surface of the body BD may be necessary. This can be clearly understood considering that the display D on the inner surface of the body BD may be damaged when the display D is folded flat. Thus, the mobile terminal 100 may require a structure in which the first radius R1 of the inner surface of the body BD is secured in the second state S2.

As shown in (a) of FIG. 2, the mobile terminal 100 in the first state S1 may resist an external force F. For example, when the external force F of the Z-axis direction is applied to the mobile terminal 100, the mobile terminal 100 is not deformed and can maintain the first state S1.

As shown in (b) of FIG. 2, the mobile terminal 100 in the second state S2 may resist an external force F. For example, when the external force F of the Z-axis direction is applied to the mobile terminal 100, the first radius R1 can be maintained in the second state S2. As described above, the first radius R1 may be necessary to prevent a damage of the display D.

Figure 3:
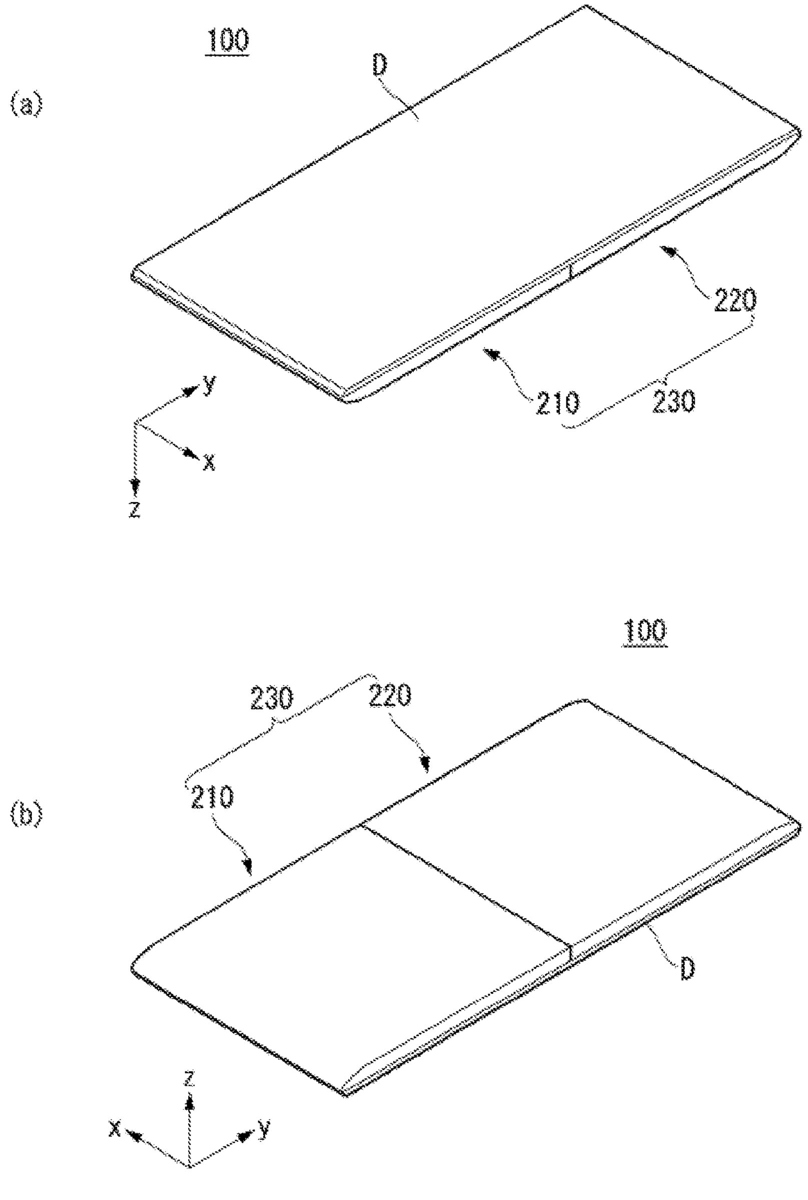
FIGS. 3 to 5 illustrate a mobile terminal according to an embodiment of the disclosure.
Figure 4:
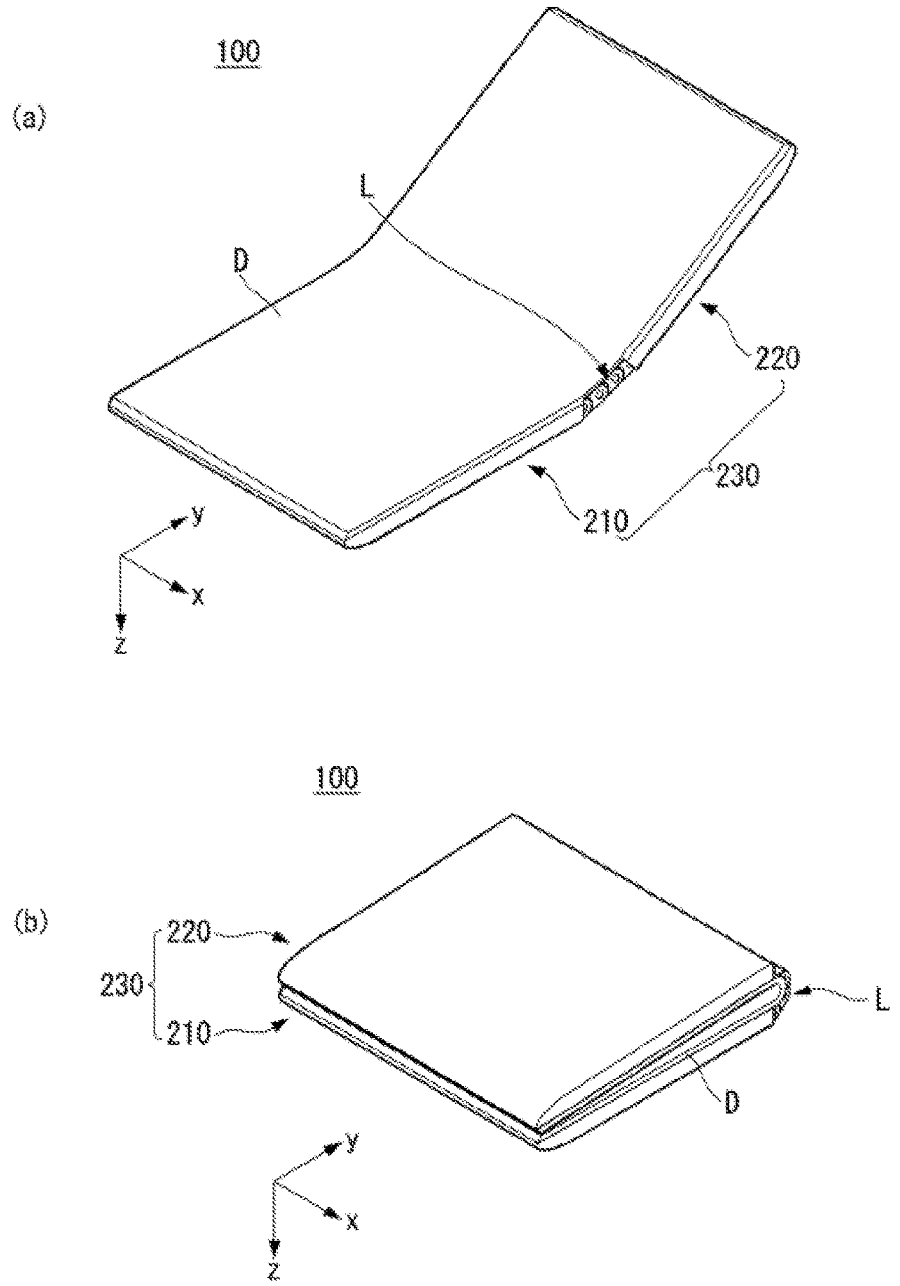
Figure 5:
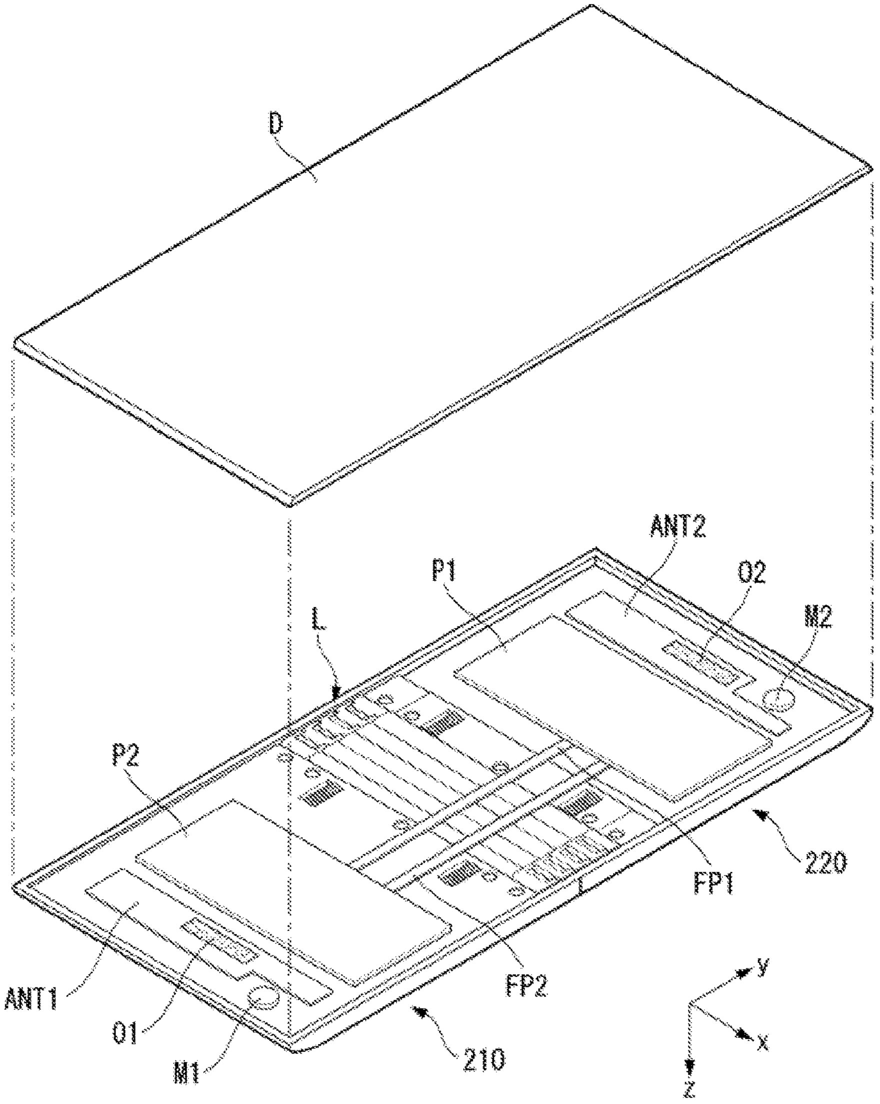

FIGS. 3 to 5 illustrate a mobile terminal according to an embodiment of the disclosure.

As shown in FIGS. 3 to 5, the mobile terminal 100 according to the embodiment of the disclosure may be in one state of the first state and the second state and/or any intervening state of the first and second states.

FIG. 3 illustrates a front surface and a rear surface of the mobile terminal 100 according to the embodiment of the disclosure in the first state. As shown in FIG. 3, a body 230 of the mobile terminal 100 may include a first body 210 and a second body 220. The display D may be positioned on the first and second bodies 210 and 220. The single display D may be successively positioned on the first and second bodies 210 and 220.

As shown in (a) of FIG. 4, which illustrates that the mobile terminal 100 according to the embodiment of the disclosure is in an intervening state of the first and second states, the first and second bodies 210 and 220 of the mobile terminal 100 may be bent at a predetermined angle and may be in a third state. The change from the first state to the second state and/or the fixation to the third state may be performed by a hinge assembly L connecting the first body 210 to the second body 220.

As shown in (b) of FIG. 4, which illustrates that the mobile terminal 100 according to the embodiment of the disclosure is in the second state, the mobile terminal 100 may be in the second state in which the first and second bodies 210 and 220 rotate about the hinge assembly L. In the second state, the first and second bodies 210 and 220 may overlap each other. Further, in the second state, the display D may be positioned inside the first and second bodies 210 and 220.

FIG. 5 illustrates a position of the hinge assembly L included in the mobile terminal 100 according to the embodiment of the disclosure. As shown in FIG. 5, the hinge assembly L may be positioned between the first and second bodies 210 and 220.

A plurality of antennas ANT1 and ANT2 may be positioned inside the mobile terminal 100. The plurality of antennas ANT1 and ANT2 may be provided at different positions of the body 230. For example, the first antenna ANT1 may be positioned in the first body 210, and the second antenna ANT2 may be positioned in the second body 220. The first and second antennas ANT1 and ANT2 may be respectively positioned at ends of the first and second bodies 210 and 220 in order to prevent mutual interference between the first and second antennas ANT1 and ANT2.

A plurality of substrates P1 and P2 may be positioned inside the mobile terminal 100. The plurality of substrates P1 and P2 may be provided at different positions of the body 230. For example, the first substrate P1 may be positioned on the second body 220, and the second substrate P2 may be positioned on the first body 210. The first and second substrates P1 and P2 may be connected by one or more flexible printed circuit boards (FPCBs) FP1 and FP2.

A plurality of audio output units O1 and O2 and/or a plurality of microphones M1 and M2 may be positioned inside the mobile terminal 100. For example, the plurality of audio output units O1 and O2 and/or the plurality of microphones M1 and M2 may be positioned at one end and the other end of the first and second bodies 210 and 220.

The hinge assembly L may be positioned inside the mobile terminal 100. The hinge assembly L may connect the first body 210 to the second body 220. The hinge assembly L may be positioned in the middle of the first and second bodies 210 and 220.

Figure 6:
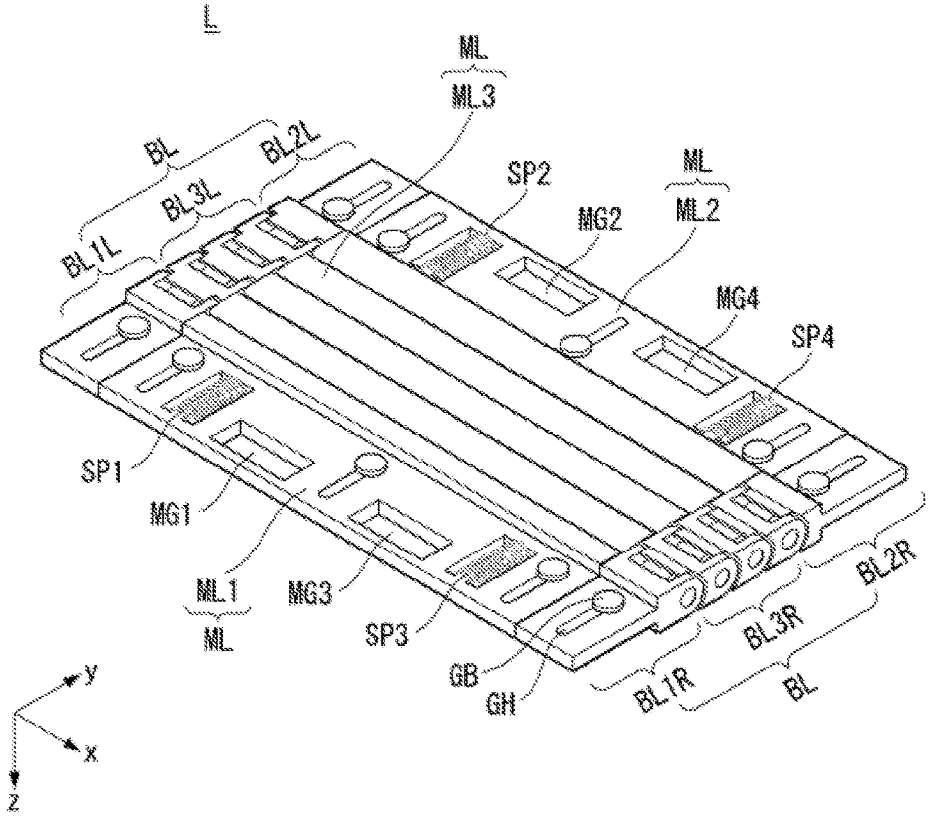
FIG. 6 illustrates a hinge assembly of FIG. 5.

FIG. 6 illustrates the hinge assembly shown in FIG. 5.

As shown in FIG. 6, the hinge assembly L of the mobile terminal 100 according to the embodiment of the disclosure may include a main hinge ML and a parallel hinge BL.

The hinge assembly L connecting the first body 210 to the second body 220 may have a structure in which at least a portion of the hinge assembly L slidingly moves. For example, as at least a portion of the hinge assembly L slidingly moves, a length of the hinge assembly L may vary. Hence, a difference in length change between an inner area and an outer area of the body 230 resulting from the thickness of the body 230 can be compensated by the sliding movement of at least a portion of the hinge assembly L and the varying length of the hinge assembly L.

The main hinge ML may be positioned in a center area of the hinge assembly L. For example, the parallel hinges BL may be positioned on both sides of the main hinge ML.

The main hinge ML may guide a folding angle of the hinge assembly L. The main hinge ML may guide a folding direction of the hinge assembly L.

The parallel hinge BL may cause the hinge assembly L to maintain a specific state.

At least one of the main hinge ML and the parallel hinge BL may cause the first and second bodies 210 and 220 to be positioned in a specific state. For example, the first and second bodies 210 and 220 may be fixed in the first state, the second state, or the third state.

At least one of the main hinge ML and the parallel hinge BL may function to reinforce rigidity of the first and second bodies 210 and 220. For example, when an external force is applied to the first and second bodies 210 and 220, at least one of the main hinge ML and the parallel hinge BL can cause the first and second bodies 210 and 220 to maintain a predetermined shape.

Configuration and operation of the main hinge ML and the parallel hinge BL will be described in detail in corresponding portion.

FIGS. 7 to 15 illustrate configuration of a mobile terminal according to an embodiment of the disclosure.

As shown in FIGS. 7 to 15, the mobile terminal 100 according to the embodiment of the disclosure can compensate for the lengths of the first and second bodies 210 and 220 that are folded through the hinge assembly L.

Figure 7:
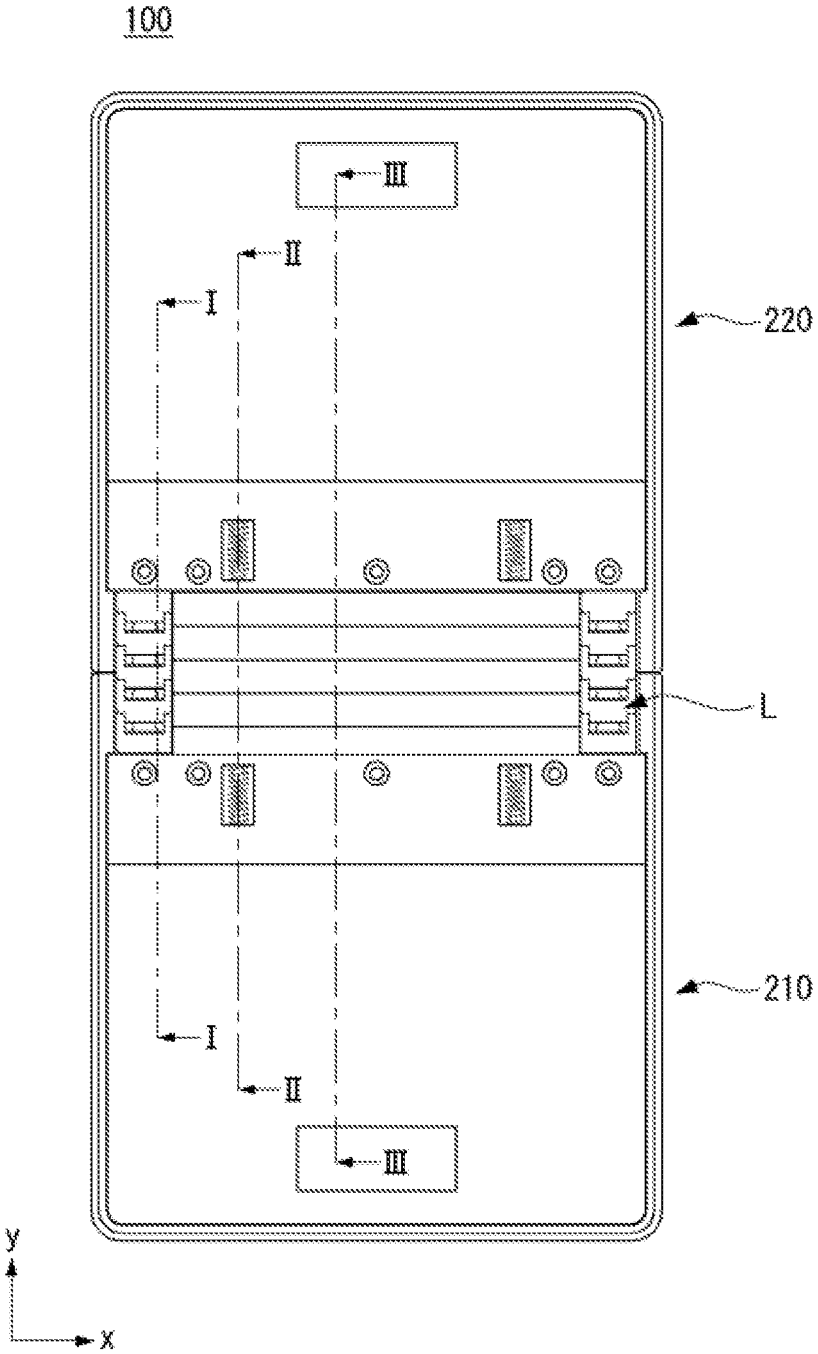
FIGS. 7 to 15 illustrate configuration of a mobile terminal according to an embodiment of the disclosure.
Figure 8:
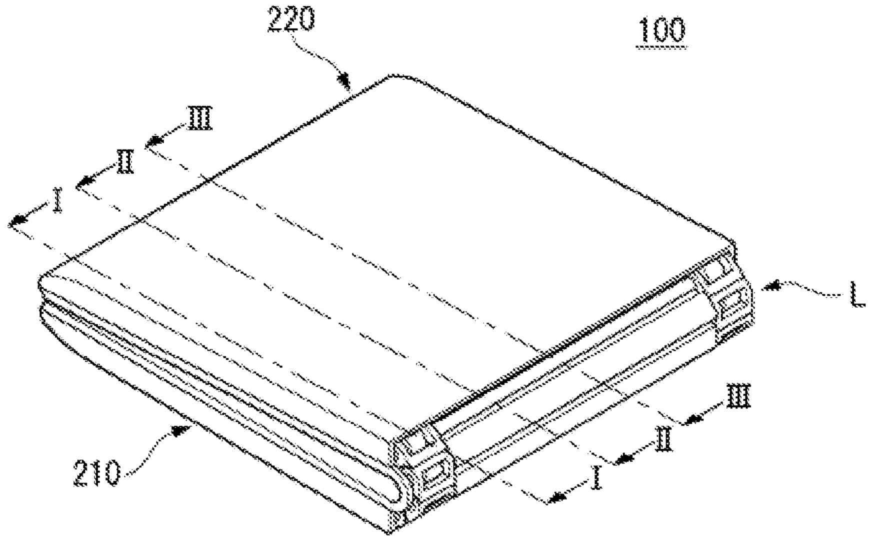

FIGS. 7 and 8 illustrate the mobile terminal 100 of the first state and the mobile terminal 100 of the second state, respectively. Positions I-I, II-II and III-III of FIG. 7 may be the same as positions I-I, II-II and III-III of FIG. 8. Hereinafter, a cross section of each of the positions I-I, II-II and III-III in the first state and a cross section of each of the positions I-I, II-II and III-III in the second state will be described, and configuration and operation of the hinge assembly L according to the embodiment of the disclosure will be described.

Figure 9:
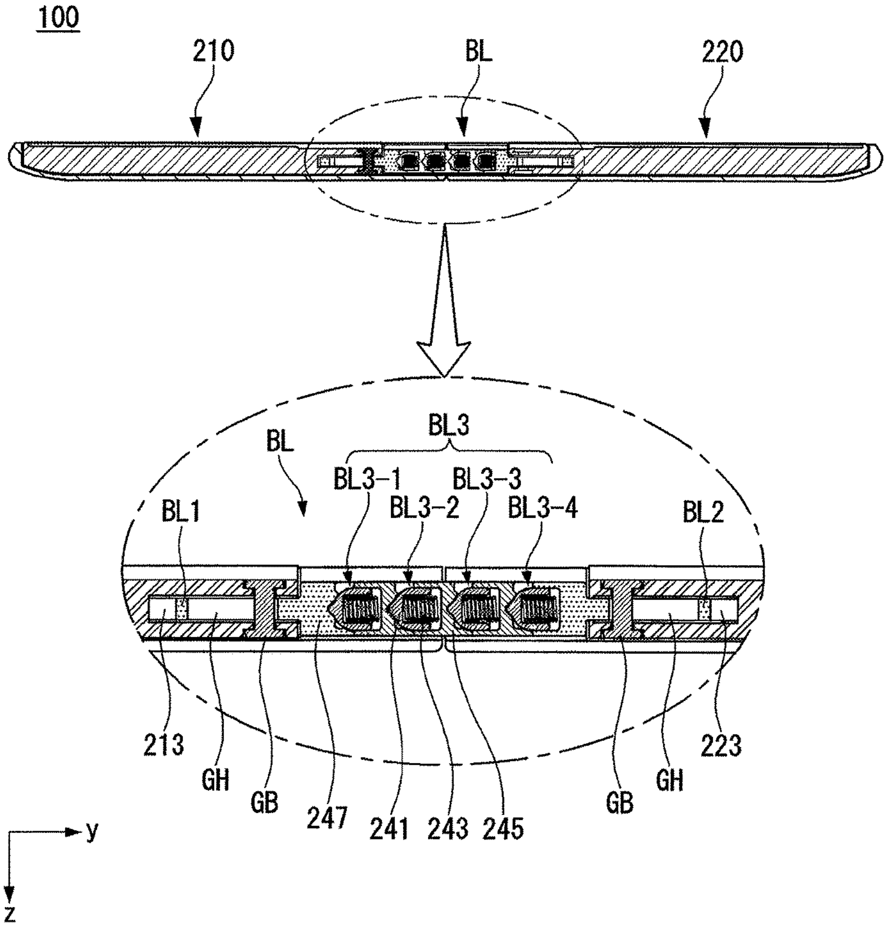
Figure 10:
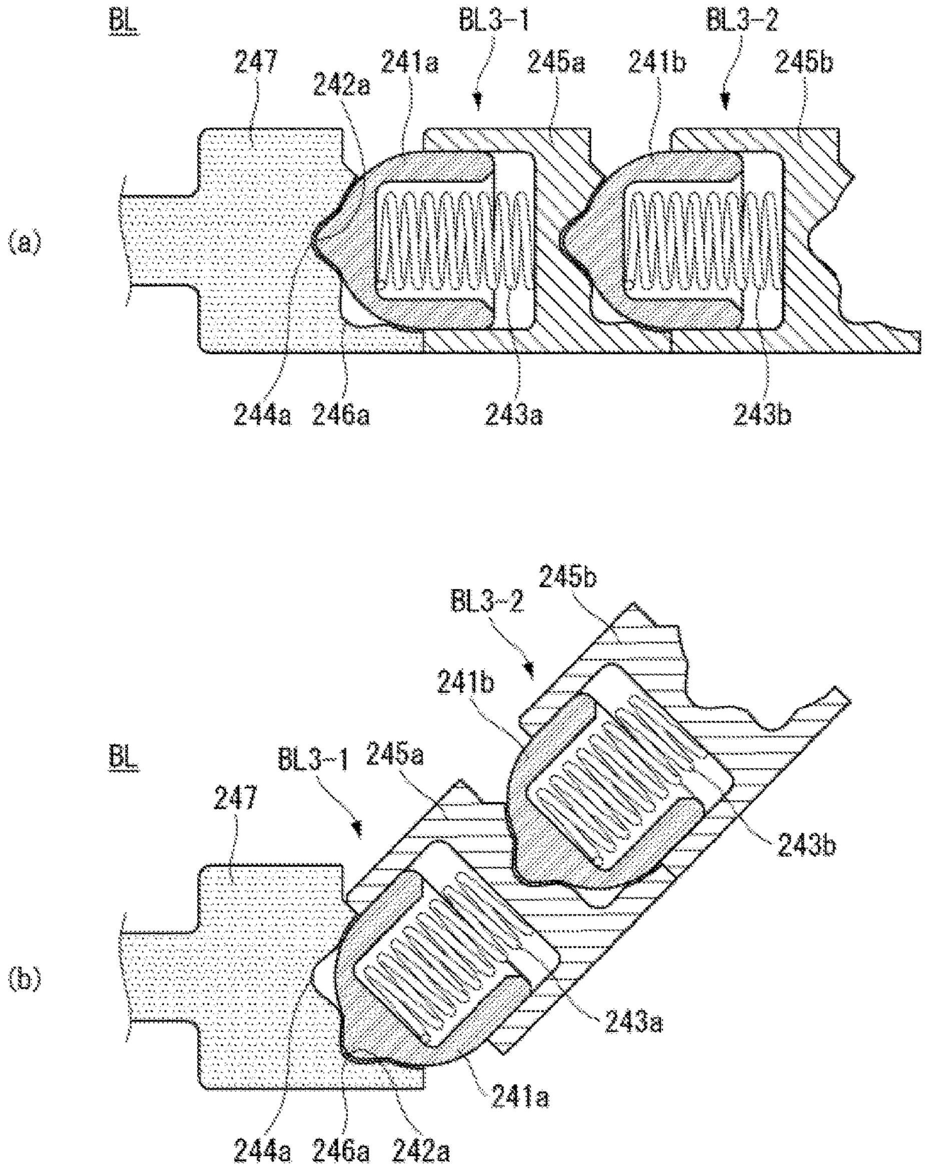
Figure 11:
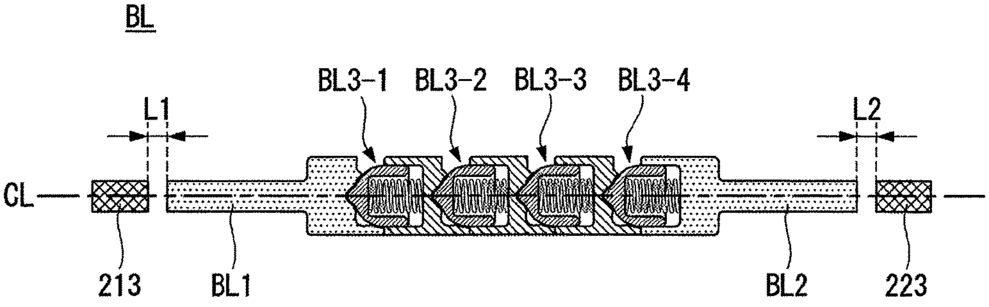
Figure 11:
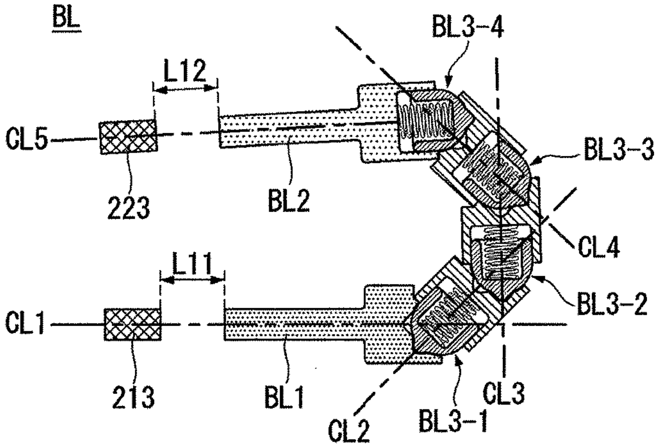

FIGS. 9 to 11 illustrate a cross section of the position I-I.

As shown in FIGS. 9 to 11, the parallel hinge BL of the mobile terminal 100 according to the embodiment of the disclosure may include first parallel hinges BL1R and BL1L, second parallel hinges BL2R and BL2L, and third parallel hinges BL3R and BL3L. As described above, the parallel hinges BL may be positioned on the left and right sides of the main hinge ML. Therefore, one of left and right configurations of the parallel hinges will be described, and description of the other will be omitted. Namely, the first parallel hinges BL1R and BL1L are denoted as reference numeral "BL1", the second parallel hinges BL2R and BL2L are denoted as reference numeral "BL2", and the third parallel hinges BL3R and BL3L are denoted as reference numeral "BL3".

As shown in FIG. 9, the first and second parallel hinges BL1 and BL2 may be positioned on both sides of the third parallel hinge BL3. The first and second parallel hinges BL1 and BL2 may slidingly move along a position of the first and second bodies 210 and 220. Namely, when the first and second bodies 210 and 220 are changed from the first state to the second state or vice versa, an end of each of the first and second parallel hinges BL1 and BL2 may be guided by a guide pin GB and may slidingly move.

The guide pin GB may be guided in a guide hole GH provided on the hinge assembly L. The guide pin GB may move along the guide hole GH to correspond to a change in length of the first and second bodies 210 and 220 resulting from a change in the state of the first and second bodies 210 and 220. The guide holes GH on both sides of the hinge assembly L may be connected to the first and second bodies 210 and 220.

The third parallel hinge BL3 may have a shape in which a plurality of blocks is coupled to one another. For example, the third parallel hinge BL3 may include first to fourth hinge blocks BL3-1 to BL3-4.

The first to fourth hinge blocks BL3-1 to BL3-4 may be configured such that one of the first to fourth hinge blocks BL3-1 to BL3-4 is coupled to the other. For example, a front portion 241 constituting the second hinge block BL3-2 may be coupled to a rear portion constituting the first hinge block BL3-1, and a rear portion 245 constituting the second hinge block BL3-2 may be coupled to a front portion constituting the third hinge block BL3-3.

Each of the first to fourth hinge blocks BL3-1 to BL3-4 may include an elastic body 243. For example, the elastic body 243 inside the second hinge block BL3-2 may press the front portion 241 and the rear portion 245 of the second hinge block BL3-2. Because each hinge block BL3 is provided with the elastic body 243, each hinge block BL3 may come into close contact with the hinge blocks BL3 at its front portion and/or the hinge blocks BL3 at its rear portion.

As shown in (a) of FIG. 10, in the first state, the first hinge block BL3-1 and the second hinge block BL3-2 may be disposed on the same plane in parallel with each other. For example, an end of a first front portion 241*a* constituting the first hinge block BL3-1 may form a first tip 242*a* of a protruding shape. The first tip 242*a* may be inserted into a first recess 244*a* of a connector 247 coupled to the end GH. A first rear portion 245*a* of the first hinge block BL3-1 may be coupled to a second front portion 241*b* of the second hinge block BL3-2.

As shown in (b) of FIG. 10, when a force is applied to the hinge block BL, the change in the state of the mobile terminal 100 may occur. For example, a position of the first tip 242*a* may move from the first recess 244*a* to a second recess 246*a*.

The movement of the first tip 242*a* may be affected by an elastic force of a first elastic body 243*a* and/or a size of a protrusion between the first and second recesses 244*a* and 246*a*. For example, a magnitude of an external force required to move the first tip 242*a* may vary depending on whether the elastic force of the first elastic body 243*a* is strong or weak. This can be easily understood in consideration of the fact that the protrusion exists between the first recess 244*a* and the second recess 246*a*. Namely, in order to move the first tip 242*a* from the first recess 244*a* to the second recess 246*a*, an external force equal to or greater than the elastic force of the first elastic body 243*a* is applied to the first tip 242*a*, and the first tip 242*a* has to pass over the protrusion between the first and second recesses 244*a* and 246*a*.

The tips 242 constituting the hinge blocks BL may simultaneously or sequentially move. For example, when the elastic bodies 243*a* constituting the hinge blocks BL have the same elastic force and/or the protrusions constituting the hinge blocks BL have the same size, the tips 242 constituting the hinge blocks BL may substantially simultaneously move when an external force equal to or greater than a predetermined level is applied to the tips 242. On the contrary, when the elastic bodies 243*a* constituting the hinge blocks BL have different elastic forces and/or the protrusions constituting the hinge blocks BL have different sizes, the tips 242 constituting the hinge blocks BL may sequentially move depending on a strength of the external force.

As shown in (a) of FIG. 11, when the first and second bodies 210 and 220 are flat and in the first state, the hinge blocks BL may be positioned in parallel with each other. Namely, the first to fourth hinge blocks BL3-1 to BL3-4 may be positioned on a first line CL.

In the first state, one end BL1 and the other end BL2 of the hinge block BL may be spaced apart from one side 213 and the other side 223 of the first and second bodies 210 and 220 of the mobile terminal 100 by first and second distances L1 and L2.

As shown in (b) of FIG. 11, when the first and second bodies 210 and 220 are bent and in the second state, the hinge block BL may be bent. Namely, the first to fourth hinge blocks BL3-1 to BL3-4 may be positioned on the first to fifth lines CL1 to CL5.

In the second state, one end BL1 and the other end BL2 of the hinge block BL may be spaced apart from one side 213 and the other side 223 of the first and second bodies 210 and 220 of the mobile terminal 100 by eleventh and twelfth distances L11 and L12. The eleventh and twelfth distances L11 and L12 may be greater than the first and second distances L1 and L2. Namely, the change in the length of the first and second bodies 210 and 220 resulting from the bending of the first and second bodies 210 and 220 can be compensated by the sliding movement between the hinge block BL and the body 230.

Figure 12:
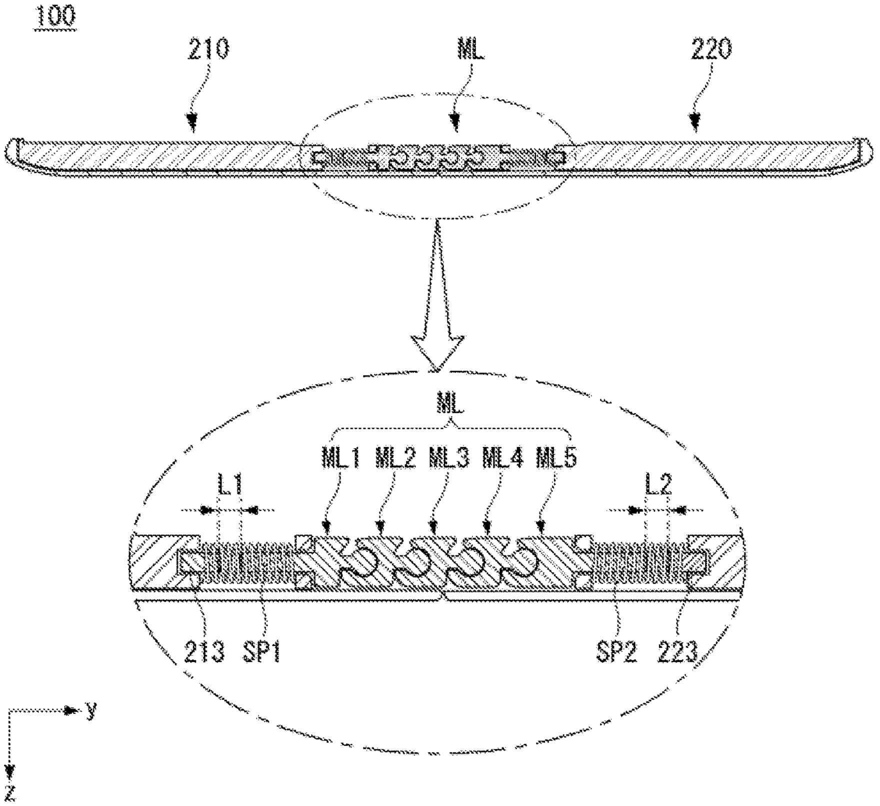
Figure 13:
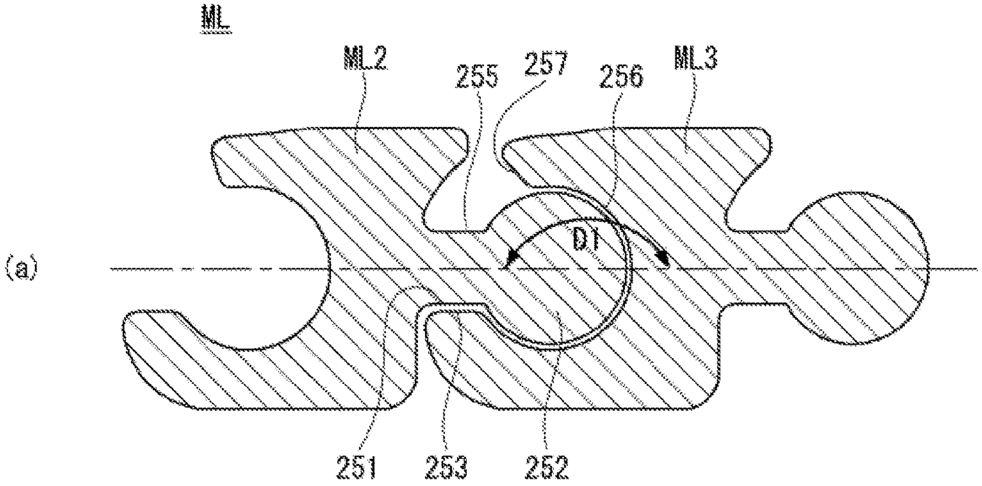
Figure 13:
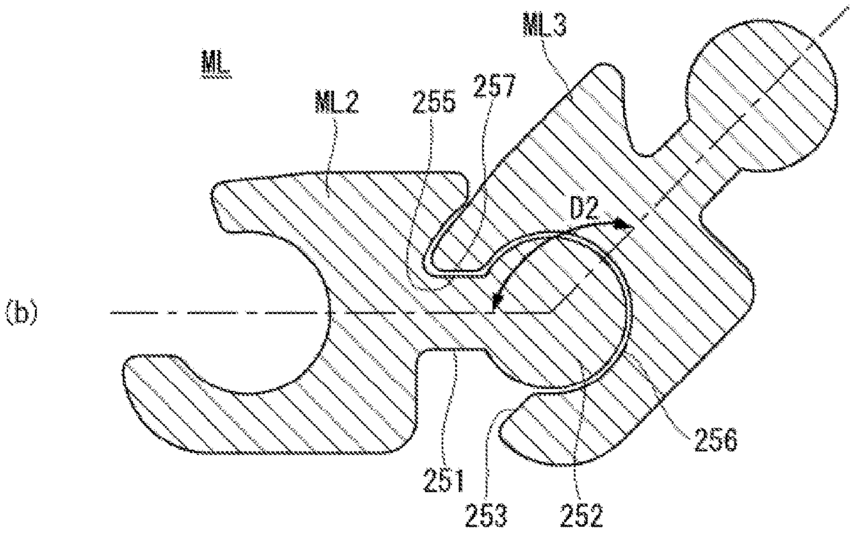
Figure 14:
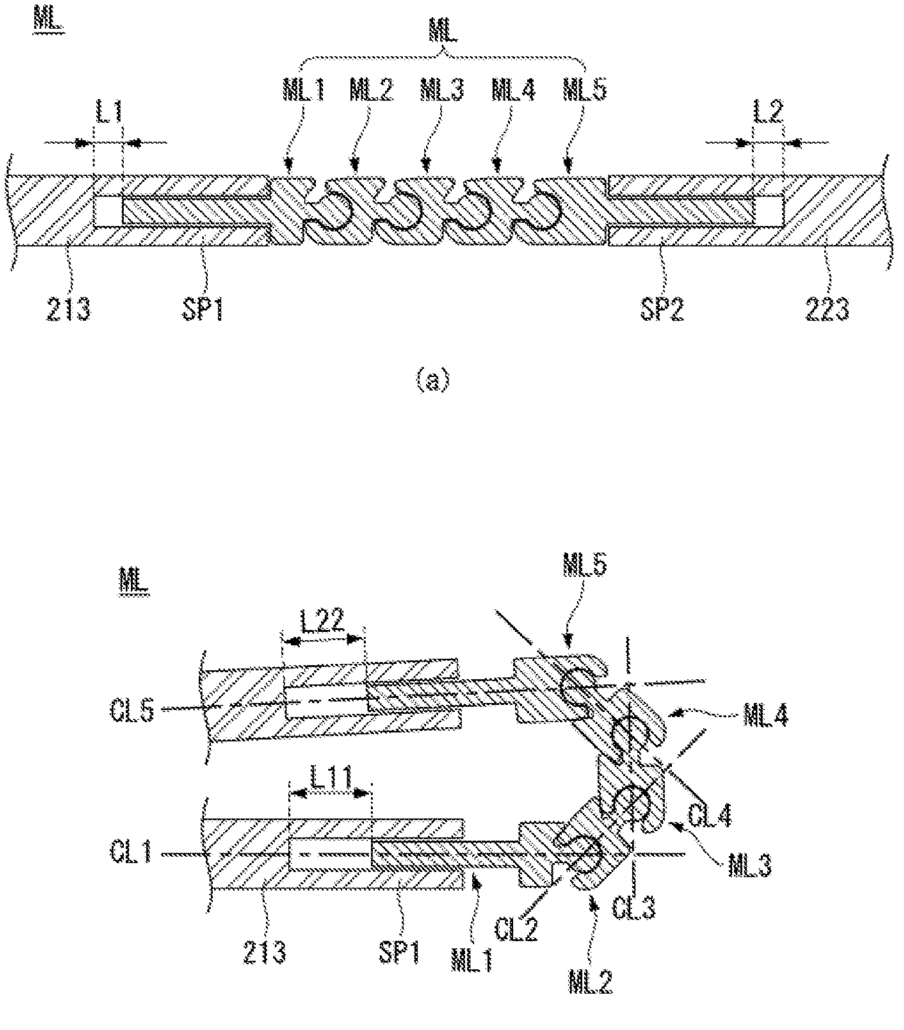

FIGS. 12 to 14 illustrate a cross section of the position II-II.

As shown in FIGS. 12 to 14, the change in the state of the mobile terminal 100 according to the embodiment of the disclosure may be performed through the main hinge ML.

As shown in FIG. 12, the main hinge ML may include a plurality of main blocks ML1 to ML5.

The plurality of main blocks ML1 to ML5 may be configured such that one of the main blocks ML1 to ML5 is coupled to the other. One end of the first main block ML1 and the other end of the fifth main block ML5 in the plurality of main blocks ML1 to ML5 may be respectively spaced apart from one side 213 and the other side 223 of the first and second bodies 210 and 220 of the mobile terminal 100 by the first and second distances L1 and L2.

First and second springs SP1 and SP2 may be positioned between one end SP1 of the first main block ML1 and/or the other end SP2 of the fifth main block ML5 and one side 213 and the other side 223 of the first and second bodies 210 and 220. Thus, the first and second springs SP1 and SP2 may apply a compressive force to the plurality of main blocks ML1 to ML5. In other words, the first and second springs SP1 and SP2 may apply the force to the plurality of main blocks ML1 to ML5 in a direction away from the first and second bodies 210 and 220.

As shown in (a) of FIG. 13, when the first and second bodies 210 and 220 are in the first state, the plurality of main blocks ML1 to ML5 constituting the main hinge ML may be positioned in parallel with one another. For example, the second main block ML2 and the third main block ML3 may be positioned on a straight line. In other words, a first angle D1 between the second main block ML2 and the third main block ML3 may form 180°.

A coupling portion 252 of the second main block ML2 may have a circular cross section. For example, the coupling portion 252 of the second main block ML2 may have a sphere shape or a cylinder shape. The coupling portion 252 of the second main block ML2 may be inserted into an accommodating portion 256 of the third main block ML3. The accommodating portion 256 may have a shape corresponding to the coupling portion 252.

A first support surface 251 may be positioned at a lower side of the coupling portion 252.

When the first and second bodies 210 and 220 are in the first state, the first support surface 251 of the second main block ML2 may be in contact with a second support surface 253 of the third main block ML3. Thus, the movement of the third main block ML3 may be restricted by the contact between the first and second support surfaces 251 and 253. Namely, the second and third main blocks ML2 and ML3 cannot be opened at an angle equal to or greater than the first angle D1.

As shown in (b) of FIG. 13, when an external force is applied to the first and second bodies 210 and 220, the third main block ML3 may rotate in a predetermined direction with respect to the second main block ML2. For example, an angle between the second main block ML2 and the third main block ML3 may be changed from the first angle D1 to a second angle D2.

The second angle D2 between the second and third main blocks ML2 and ML3 may be determined by a third support surface 255 of the second main block ML2 and a fourth support surface 257 of the third main block ML3. Namely, when the fourth support surface 257 of the third main block ML3 that has rotated counterclockwise due to the external force contacts the third support surface 255 of the second main block ML2, the third main block ML3 may stop rotating.

A displacement of each of the main blocks ML1 to ML5 may be determined by the contact between the second and fourth support surfaces 253 and 257 and the first and third support surfaces 251 and 255 of each of the main blocks ML1 to ML5. Thus, an entire displacement angle of the main hinge ML may be a sum of displacement angles of the main blocks ML1 to ML5 determined by the above-described support surfaces.

As shown in (a) of FIG. 14, in the first state, the plurality of main blocks ML1 to ML5 may be positioned on the same plane in parallel with one another. In this instance, one end SP1 of the first main block ML1 may be spaced apart from the first side 213 of the first body 210 by a first distance L1, and the other end SP2 of the fifth main block ML5 may be spaced apart from the other side 223 of the second body 220 by a second distance L2.

As shown in (b) of FIG. 14, in the second state, the plurality of main blocks ML1 to ML5 may sequentially rotate. For example, the plurality of main blocks ML1 to ML5 may be positioned on first to fifth lines CL1 to CL5. In this instance, one end SP1 of the first main block ML1 may be spaced apart from the first side 213 of the first body 210 by an eleventh distance L11, and the other end SP2 of the fifth main block ML5 may be spaced apart from the other side 223 of the second body 220 by a twenty-second distance L22. Namely, as one end SP1 of the first main block ML1 and the other end SP2 of the fifth main block ML5 slidingly move, the distances L11 and L22 may vary.

Figure 15:
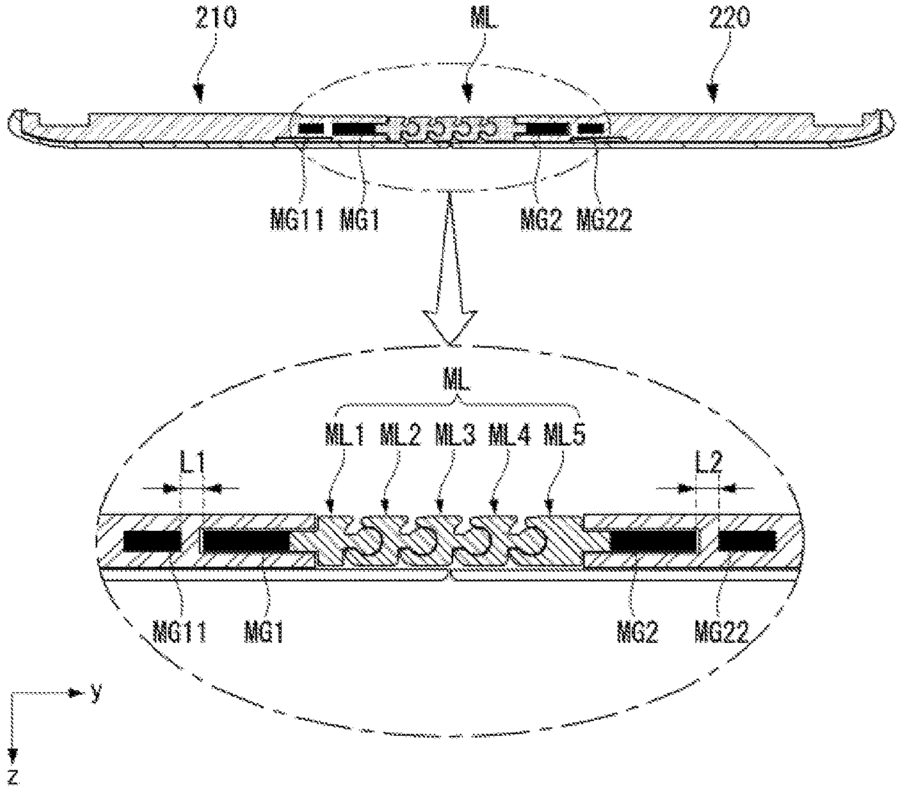

FIG. 15 illustrates a cross section of the position III-III.

As shown in FIG. 15, the mobile terminal 100 according to the embodiment of the disclosure may include magnets MG1, MG2, MG11 and MG22 restricting the sliding movement of the main block ML.

The magnets MG1, MG2, MG11 and MG22 may include first and second magnets MG1 and MG2 around the main block ML and eleventh and twenty-second magnets MG11 and MG22 around the first and second bodies 210 and 220.

An attraction force may act between the first magnet MG1 and the eleventh magnet MG11 and/or between the second magnet MG2 and the twenty-second magnet MG22. Even when there is no external force, the main block ML may be spaced apart from the first and second bodies 210 and 220 by first and second distances L1 and L2 due to the attraction force between the first magnet MG1 and the eleventh magnet MG11 and/or the attraction force between the second magnet MG2 and the twenty-second magnet MG22.

The attraction force between the magnets may act as a predetermined resistance in an initial stage of the process for changing from the first state to the second state. Namely, when a force is applied to the mobile terminal 100 of the first state, a resistance may be initially generated by the attraction force between the magnets. The initial resistance may be drastically reduced when a distance between the magnets increases by the external force.

FIGS. 16 to 20 illustrate an operation of a mobile terminal according to an embodiment of the disclosure.

As shown in FIGS. 16 to 20, the mobile terminal 100 according to the embodiment of the disclosure may perform various operations using the change in the state of the first and second bodies 210 and 220 and/or the display D provided on one side of the body 230.

Figure 16:
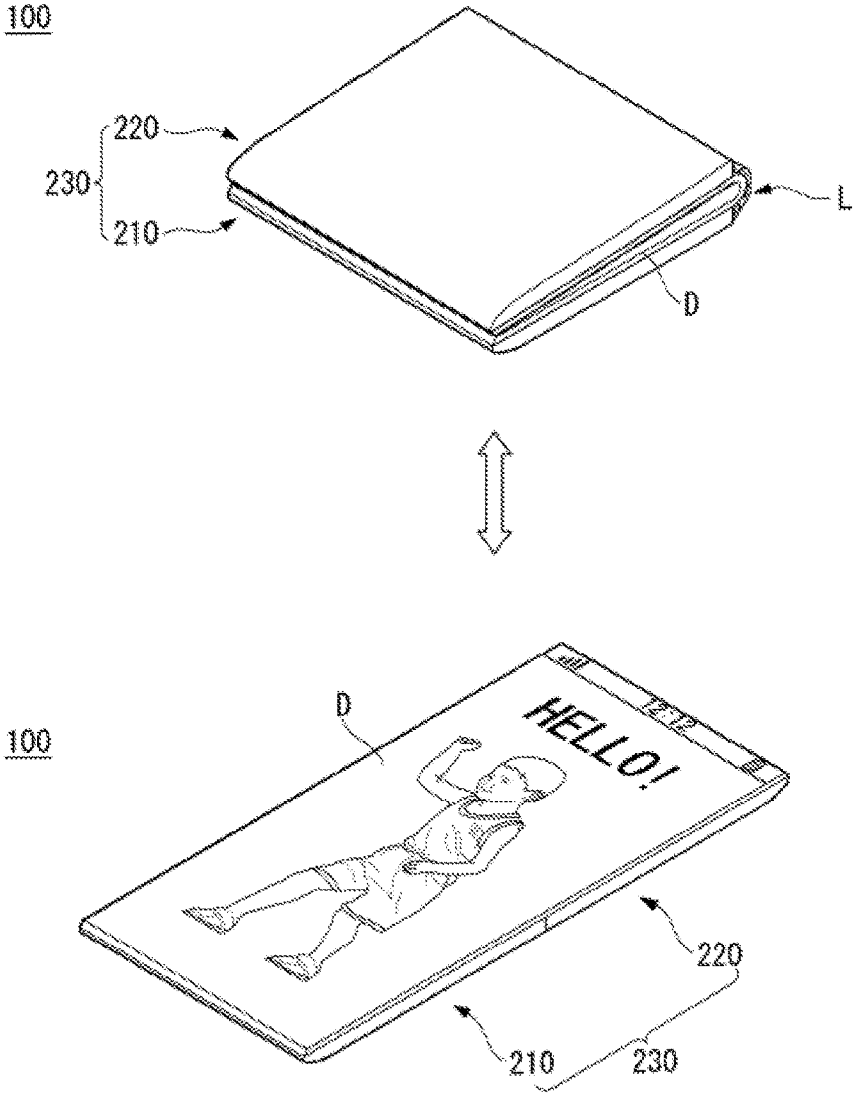
FIGS. 16 to 20 illustrate an operation of a mobile terminal according to an embodiment of the disclosure.

As shown in FIG. 16, the mobile terminal 100 may be in the first state or the second state.

When the mobile terminal 100 is changed from the second state to the first state, a controller of the mobile terminal 100 may activate the display D. Namely, the screen may be turned on even if a user does not perform any other operation such as turning on the power. On the contrary, when the mobile terminal 100 is changed from the first state to the second state, the controller of the mobile terminal 100 may inactivate the display D.

Figure 17:
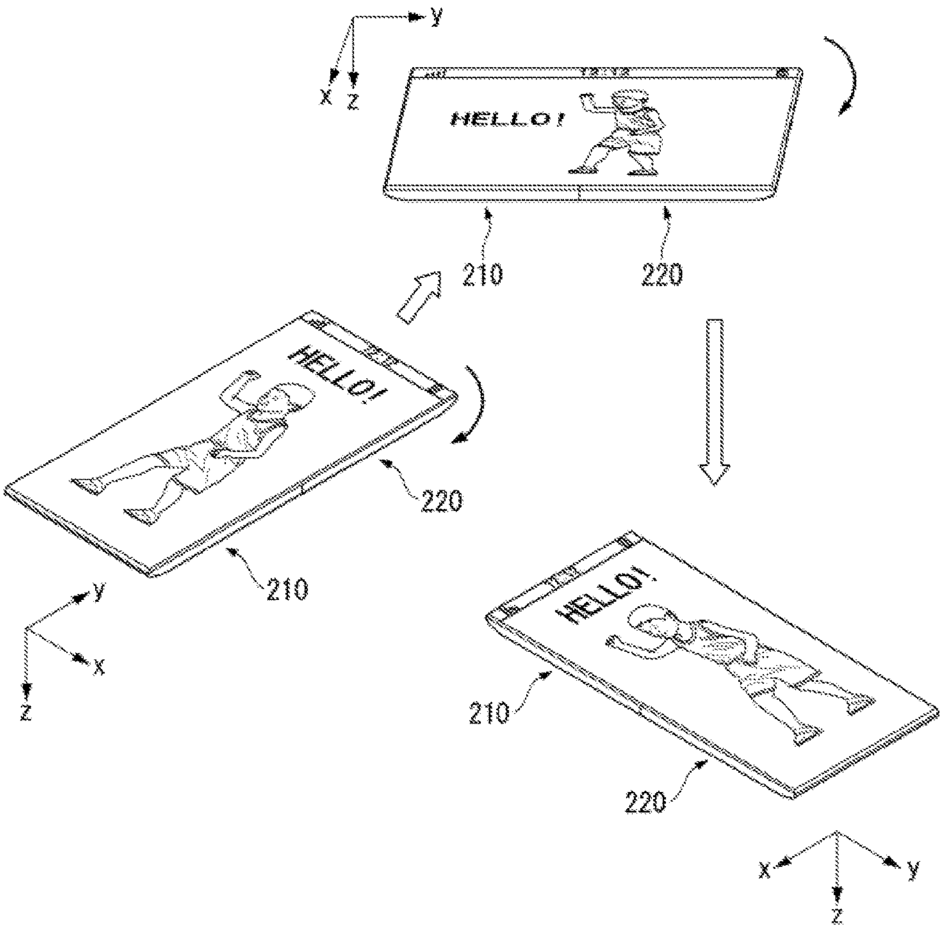

As shown in FIG. 17, the controller of the mobile terminal 100 may change a display direction of the display D depending on an orientation direction of the mobile terminal 100.

In an initial state, the mobile terminal 100 may be arranged such that a longitudinal direction of the mobile terminal 100 is parallel to a Y-axis direction. In this instance, the controller 180 may display an image along a direction parallel to the Y-axis direction. For example, the mobile terminal 100 may display an image so that the upper side of the mobile terminal 100 becomes the top.

In a next state, the mobile terminal 100 may be arranged such that a width direction of the mobile terminal 100 is parallel to the Z-axis direction due to user's operation or the like. In this instance, the controller 180 may display an image along a direction parallel to the Z-axis direction. For example, the mobile terminal 100 may display an image so that the side of the mobile terminal 100 becomes the top.

In a next state, the mobile terminal 100 may be arranged such that the longitudinal direction of the mobile terminal 100 is parallel to the Y-axis direction. However, unlike the initial state, a downward direction (or a lower side) of the mobile terminal 100 may be disposed at the upper side. In this instance, the controller 180 may display an image so that the downward direction (or a lower side) of the mobile terminal 100 becomes the top.

The display D may be a seamless device not having a connection part. Thus, the user cannot clearly recognize which portion is the upper side of the mobile terminal 100. The controller of the mobile terminal 100 according to the embodiment of the disclosure can change a display direction of an image depending on a direction in which the user holds the mobile terminal 100, thereby allowing the user to conveniently view the image.

Figure 18:
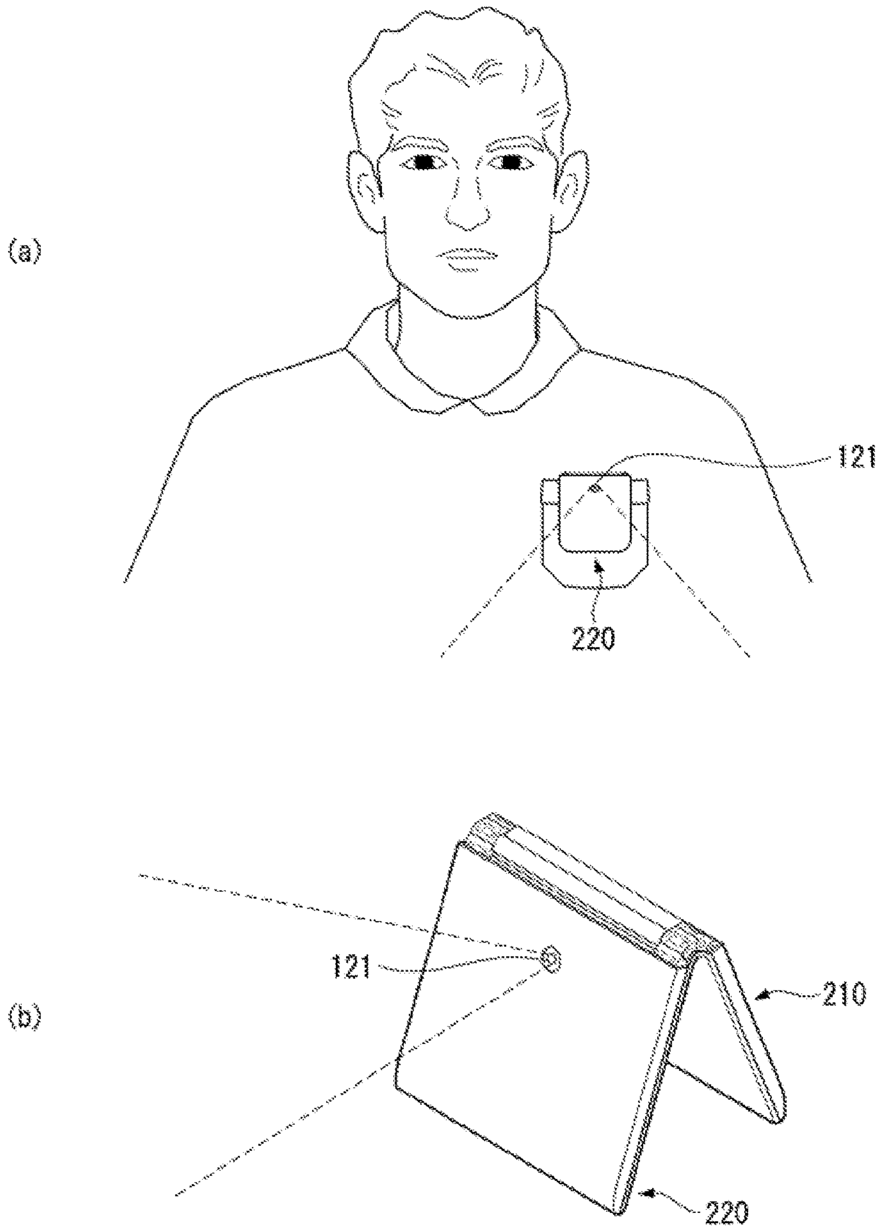

As shown in FIG. 18, a camera 121 may be added to the mobile terminal 100 according to the embodiment of the disclosure. The camera 121 may be provided in an outer portion of the mobile terminal 100. The camera 121 may be formed at the second body 220 of the mobile terminal 100.

As shown in (a) of FIG. 18, the mobile terminal 100 may be in the second state in which the first and second bodies 210 and 220 are folded. When the mobile terminal 100 is in the second state, the camera 121 may face forward. For example, when the folded mobile terminal 100 is fixed to a pocket of the user with a clip, the camera 121 may be exposed forward.

Even when the mobile terminal 100 is in the second state, the controller 180 may cause the camera 121 to be activated. For example, the camera 121 may be activated even in an inactivated state of the display D. In this instance, the user can take necessary image while minimizing power consumption required for the operation of the display D, etc. In addition, because the mobile terminal 100 is put in the user's pocket, the user can take the image without using a separate stand.

As shown in (b) of FIG. 18, the mobile terminal 100 may be in the third state. Namely, the mobile terminal 100 may be in an intervening state of the first state in which the first and second bodies 210 and 220 are completely unfolded and the second state in which the first and second bodies 210 and 220 are completely folded. In this instance, the first and second bodies 210 and 220 may serve as the stand. Namely, the camera 121 of the mobile terminal 100 may be supported by the first and second bodies 210 and 220 and may face forward.

Figure 19:
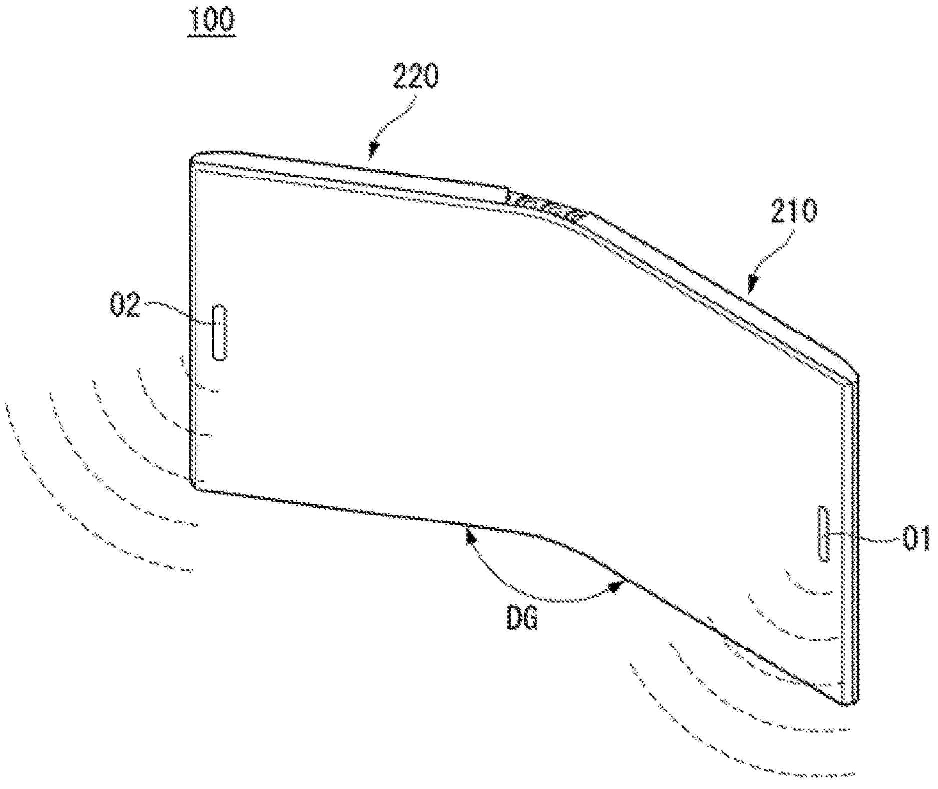

As shown in FIG. 19, the mobile terminal 100 may be in an intervening state of the first state and the second state. In this instance, the mobile terminal 100 may be raised laterally using a specific flaring angle DG between the first and second bodies 210 and 220.

Audio output units O1 and O2 may be positioned at one end and the other end of the mobile terminal 100. For example, the first audio output unit O1 may be positioned at an end of the second body 220, and the second audio output unit O2 may be positioned at an end of the first body 210. When the mobile terminal 100 of the third state is raised laterally, the user can enjoy better quality sound using the first and second audio output units O1 and O2.

Figure 20:
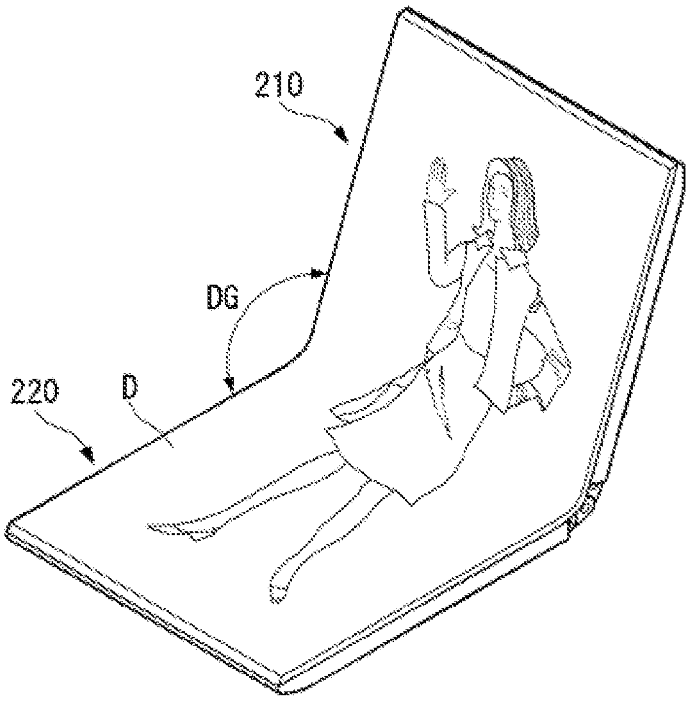

As shown in FIG. 20, the user can enjoy the image on the display D using the flaring angle DG between the first and second bodies 210 and 220. Namely, even when the user does not hold the mobile terminal 100 at a specific angle using the hand or the stand, the user can enjoy the image by fixing the mobile terminal 100 at the predetermined flaring angle DG.

Figure 21:
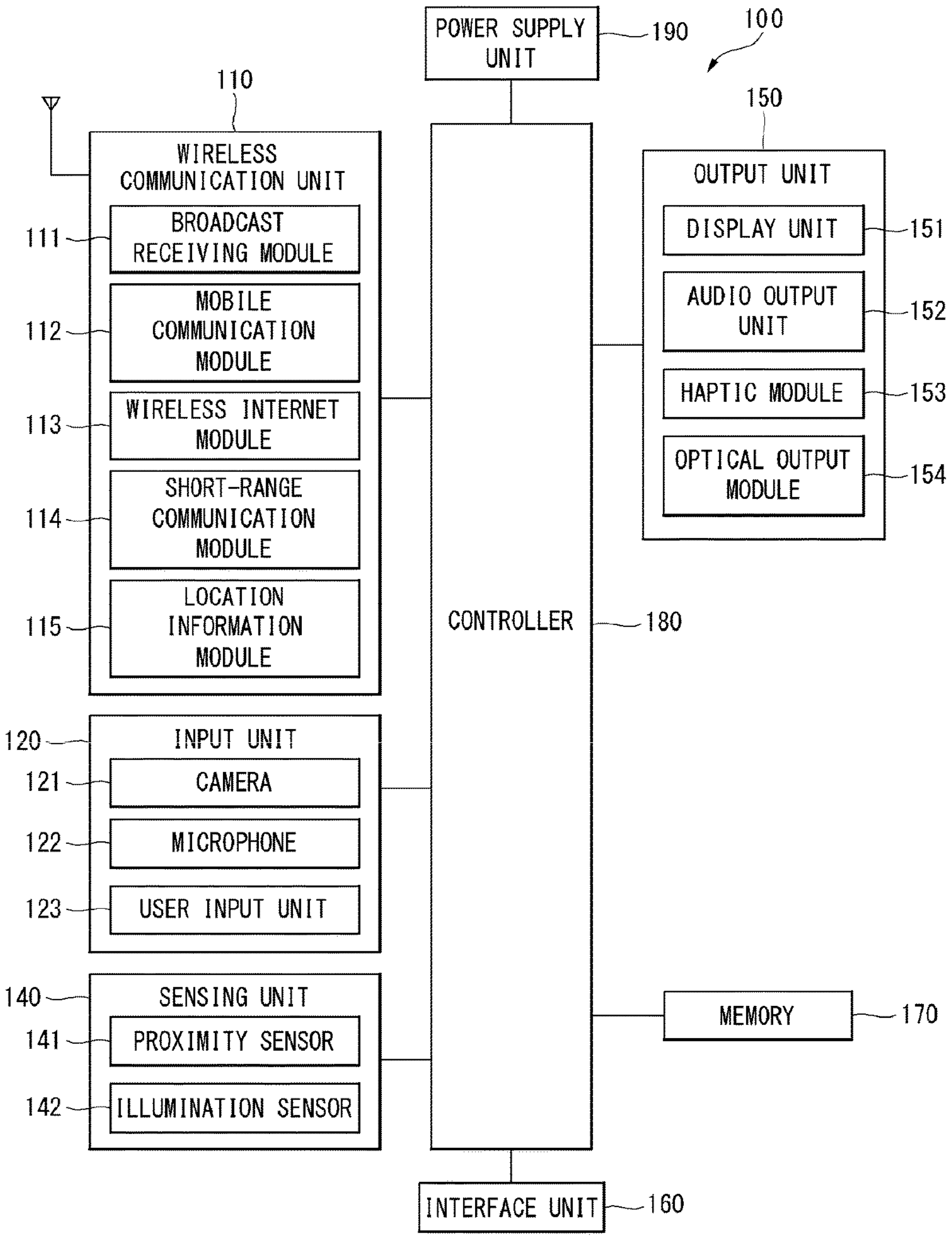
FIG. 21 is a block diagram of a mobile terminal related to an embodiment of the disclosure.

FIG. 21 is a block diagram of a mobile terminal related to an embodiment of the disclosure.

The mobile terminal 100 may include a wireless communication unit 110, an input unit 120, a sensing unit 140, an output unit 150, an interface unit 160, a memory 170, a controller 180, a power supply unit 190, and the like. It is understood that implementing all of the components illustrated in FIG. 21 is not a requirement for the mobile terminal, and that more or fewer components may alternatively be implemented.

More specifically, the wireless communication unit 110 may include one or more modules which permit communications such as wireless communications between the mobile terminal 100 and a wireless communication system, communications between the mobile terminal 100 and another mobile terminal, and communications between the mobile terminal 100 and an external server. Further, the wireless communication unit 110 may include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 which is one type of an image input unit for obtaining images or video, a microphone 122 which is one type of an audio input unit for inputting an audio signal, and a user input unit 123 (for example, a touch key, a push key, a mechanical key, a soft key, and the like) for allowing a user to input information. Data (for example, audio, video, image, and the like) obtained by the input unit 120 may be analyzed and processed by user control commands.

The sensing unit 140 may be implemented using one or more sensors configured to sense internal information of the mobile terminal, the surrounding environment of the mobile terminal, user information, and the like. For example, the sensing unit 140 may include a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a fingerprint scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from the sensing unit 140, and in particular, information obtained from one or more sensors of the sensing unit 140, and combinations thereof.

The output unit 150 may be typically configured to output various types of information, such as audio, video, tactile output, and the like. The output unit 150 may include one or more of a display unit 151, an audio output unit 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160 may include one or more of wired or wireless headset ports, external power supply ports, wired or wireless data ports, memory card ports, ports for connecting a device having an identification module, audio input/output (I/O) ports, video I/O ports, and earphone ports. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions (for example, receiving a call, placing a call, receiving a message, sending a message, and the like) of the mobile terminal 100. It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 21, or activating application programs stored in the memory 170.

The controller 180 may control some or all of the components illustrated in FIG. 21 according to the execution of an application program that have been stored in the memory 170. In addition, the controller 180 may combine and operate at least two of the components included in the mobile terminal 100 for the execution of the application program.

The power supply unit 190 may be configured to receive external power or provide internal power in order to supply appropriate power required for operating elements and components included in the mobile terminal 100. The power supply unit 190 may include a battery, and the battery may be configured to be embedded in the device body, or configured to be detachable from the device body.

At least some of the above components may be combined with one another and operate, in order to implement an operation, a control, or a control method of a mobile terminal according to various embodiments described below. Further, an operation, a control, or a control method of a mobile terminal according to various embodiments may be implemented by an execution of at least one application program stored in the memory 170.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

The invention claimed is:

1. A mobile terminal comprising:

a body including a first body having a first end opposite a second end and a second body having a first end opposite a second end, each of the first and second bodies having a first surface extending between the first and second ends of the first and second bodies;

a display positioned on the first surfaces of the first and second bodies to extend continuously across the first and second bodies; and a hinge assembly positioned between the first and second bodies and connecting the first and second bodies, wherein at least a portion of the hinge assembly slidingly moves with respect to another portion of the hinge assembly so that a position of the first and second bodies is changed from a first state in which the first surfaces of the first and second bodies are disposed on a same plane to a second state in which one of the first and second bodies is folded on the other of the first and second bodies, wherein the hinge assembly includes:

a main hinge configured to control a folding angle between the first and second bodies; and a parallel hinge configured to maintain the first and second bodies in a specific state including the first and second states, wherein the parallel hinge includes a plurality of hinge blocks, each of the hinge blocks being positioned on a same plane in the first state and positioned on different planes in the second state, and wherein the plurality of hinge blocks includes:

a first hinge block having a first recess and a second recess; and a second hinge block including a tip that is coupled to the first recess of the first hinge block in the first state and that is coupled to the second recess of the first hinge block in the second state, and an elastic body pressing the tip towards the first hinge block.

2. The mobile terminal of claim 1, wherein the hinge assembly connects the first end of the first body to the first end of the second body, and wherein a sliding length of the hinge assembly corresponds to a change in a distance between the first end of the first body and the first end of the second body resulting from a change from the first state to a specific state of the first and second bodies between the first state and up to and including the second state.

3. The mobile terminal of claim 2, wherein, in the second state, the second end of the first body is adjacent the second end of the second body, and wherein the first end of the first body is spaced apart from the first end of the second body by the hinge assembly.

4. The mobile terminal of claim 3, wherein the sliding length of the hinge assembly corresponds to a distance between the first end of the first body and the first end of the second body which are spaced apart from each other by the hinge assembly.

5. The mobile terminal of claim 1, wherein the main hinge includes a plurality of main blocks, each of the main blocks being positioned on a same plane in the first state and positioned on different planes in the second state.

6. The mobile terminal of claim 5, wherein the plurality of main blocks includes:

a first main block having a coupling portion; and a second main block fastened to the coupling portion of the first main block, the second main block having a second support surface contacting a first support surface of the first main block in the first state, and the second main block having a fourth support surface contacting a third support surface of the first main block in the second state.

7. The mobile terminal of claim 5, wherein each of the main blocks includes a coupling portion having first and third support surfaces opposite each other and an accommodating portion having second and fourth support surfaces spaced from each other at ends of the accommodating portion, and wherein a displacement angle of the main hinge is a sum of displacement angles determined by a contact between the second and fourth support surfaces and the first and third support surfaces of each of the plurality of main blocks.

8. The mobile terminal of claim 5, claim 1, wherein at least one of the main hinge and the parallel hinge includes:

a guide hole coupled to the first and second bodies; and a guide pin inserted into the guide hole and movable along the guide hole in response to a change in the position of the first and second bodies from the first state to the second state.

9. The mobile terminal of claim 1, further comprising a controller configured to selectively activate the display depending on a specific state of the body including the first state and the second state.

10. The mobile terminal of claim 1, further comprising:

at least one camera positioned to face outside the body; and a controller configured to deactivate the display and activate the camera in the second state.

11. The mobile terminal of claim 1, further comprising a controller configured to change a display direction of an image displayed on the display depending on an orientation direction of the body.

12. The mobile terminal of claim 1, wherein the display is a flexible display that is bent corresponding to a change in a specific state of the first and second bodies including the first state and the second state.

13. The mobile terminal of claim 1, wherein each of the first and second bodies includes a body magnet, and wherein the main hinge includes a hinge magnet opposite each of the body magnets of the first and second bodies, the hinge and body magnets providing a resistive force against initially changing the first and second bodies from the first state to the second state.

14. The mobile terminal of claim 5, wherein the parallel hinge includes a plurality of hinge blocks, each of the hinge blocks being positioned on the same plane as the plurality of main blocks in the first state and positioned on different planes in the second state.

15. The mobile terminal of claim 6, wherein the first support surface and the third support surface of the first main block are arranged opposite each other to define a portion of the coupling portion of the first main block.

16. The mobile terminal of claim 15, wherein the second main block includes an accommodating portion to receive the coupling portion of the first main block, and wherein the second support surface and the fourth support surface are spaced from each other at ends of the accommodating portion.

17. The mobile terminal of claim 10, wherein each of the first and second bodies includes a second surface opposite the first surface, and wherein the at least one camera is located on one of the second surfaces of the first and second bodies.

* * * * *